UNITED STATES PATENT OFFICE.

RALPH S. SHERWIN, OF EAST ST. LOUIS, ILLINOIS, ASSIGNOR TO ALUMINUM COMPANY OF AMERICA, OF PITTSBURGH, PENNSYLVANIA, A CORPORATION OF PENNSYLVANIA.

PROCESS OF OBTAINING ALUMINA.

1,422,004.  Specification of Letters Patent.  Patented July 4, 1922.

No Drawing. Application filed January 16, 1914, Serial No. 812,594. Renewed April 3, 1919. Serial No. 287,347.

*To all whom it may concern:*

Be it known that I, RALPH S. SHERWIN, resident of East St. Louis, in the county of St. Clair and State of Illinois, have invented a new and useful Improvement in Processes of Obtaining Alumina, of which the following is a specification.

This invention relates to the so-called "furnacing processes" of separating alumina from aluminous material, that is, processes in which the aluminous material with a suitable reagent is subjected to a sintering temperature, the sintered material afterward crushed and leached, and the alumina precipitated from the lye or solution so formed.

The purpose of the present invention is to adapt the furnacing process to the treatment of aluminous material containing such a proportion of silica, either in chemical combination or in mechanical mixture therewith, as to render it uneconomical to treat according to the usual commercial processes. Among the aluminous materials to which the process is particularly adapted are low grade bauxites, which contain a considerable percentage of silica mostly in mechanical mixture, natural clays, principally silicates of alumina, and the so-called "red mud" which is the solid residue resulting from the wet or digester treatment of bauxite and similar aluminous earths for the separation of alumina therefrom, and which contains a large amount of silica, much of it in chemical combination with the alumina, and which heretofore has been considered merely as waste material useful for filling for low land or similar uses.

The large amount of silica contained in the low grade bauxites, clay, and the so-called "red mud," and especially the silica which is in chemical combination with the alumina, has rendered the usual commercial processes for separating alumina from high grade bauxites impractical, or at least uneconomical to apply to said low grade materials. The silica in these lower grade and waste materials holds the alumina and prevents it from being dissolved by the ordinary processes of recovering alumina.

The process, generally stated, consists in mixing the aluminous material, with some alkaline material, preferably lime, and with a small amount of sodium compound (about half of the usual amount) subjecting the mixture to a sintering temperature, then leaching the sintered material with a soda solution, preferably caustic soda, which supplies the balance of the required amount of soda, precipitating the alumina from the sodium aluminate solution or lye, and finally, recovering the requisite amount of soda necessary to be applied in the furnace from the residual liquor and using the balance of the residual liquor over again as the leaching agent.

Inasmuch as the silica contained in the low grade aluminous materials referred to, is the cause of the insolubility of the alumina, it is necessary to bring a particle of the alkaline material, such for instance, as lime, into contact with practically each particle of silica, to form a silicate, for instance, calcium silicate. It is therefore necessary that the reagents be very intimately mixed with the aluminous material, and as the materials must in any event be reduced to a fine condition, preferably a pulverulent condition, it is preferred to secure this intimate mixture by grinding the two materials together,—the aluminous material having first been dried.

The preferred alkaline reagent is lime, with the addition of a small amount of sodium compound, but any form of alkaline material may be used. The lime when used may be either in the form of burnt lime ($CaO$), or limestone ($CaCO_3$), or slaked lime ($Ca(OH)_2$). The sodium compound preferably is soda ash, but may be sodium carbonate, caustic soda, sodium chloride, or any other convenient cheap form of sodium compound.

The exact amount of lime and of sodium compound to be added will vary with the composition of the aluminous material being treated. The molecular proportions of the lime to the silica $CaO:SiO_2$ may vary from 2.8 to 1, to 1.2 to 1, and the molecular proportions of the sodium compound to the alumina ($Na_2O:Al_2O_3$) may vary from 2 to 1, to .6 to 1. The most desirable proportions are sodium compound equivalent to 1 molecule of $Na_2O$ to 1 molecule of alumina and 2 molecules of lime to 1 molecule of silica.

This mixture is heated to a sintering temperature in any suitable way, preferably in a rotary kiln, and for such length of time as to bring about the reactions whereby there is formed insoluble silicate of lime and sodium aluminate in soluble form. The temperature must be so regulated that the material is fritted together but is not melted to a glass, as it is difficult to leach out the material if it is fused. The sintered material so formed is then broken up (and preferably ground) and leached, forming a sodium aluminate solution or lye, and leaving a residue which is principally calcium silicate, with such other impurities as oxids of iron, titanium or the like, as are contained in the low grade bauxite, clay or red mud being worked.

The exact reactions taking place in the furnace is a matter on which opinions differ, but the essential thing is to get rid of the large amount of silica, whether in mere mixture or in chemical combination with the alumina, by causing it to combine with the lime and form a calcium silicate, and thereby free the alumina and sodium compound. It is also essential that the alumina be held in a form in which it is soluble, and therefore recoverable by leaching, preferably by combining it with the sodium compound to form sodium aluminate. The final result aimed at, therefore, is to get the silica into combination with an alkaline earth material, forming insoluble silicates, such as the silicate of calcium, and have the alumina held in soluble form, preferably as sodium aluminate, and it is quite immaterial whether the reactions that take place form a single silicate or two or three different silicates.

The sintered material (preferably finely ground) is then leached with sodium compound liquor, preferably a solution of caustic soda, such, for instance, as the sodium aluminate solution from which all alumina available for precipitation has been previously precipitated, that is, the residual soda liquor resulting from the ordinary methods of precipitating alumina (e. g., the auto-precipitation process, such as the Bayer process and its modifications). By using a soda leaching solution the amount of sodium compound which need be added in the furnace, may be small, practically one-half of what would otherwise be required, the balance of sodium compound being supplied during leaching. It furthermore makes it necessary to evaporate to dryness only a portion of the soda liquor resulting from the auto-precipitation process, or such other precipitation process as may be employed, that is, only sufficient to recover the necessary amount of sodium compound which must be added to the furnace, the remainder of the liquor being used as the leaching liquor, thereby effecting a very considerable economy in the evaporation of the soda liquor.

The soda solution used for leaching out the sintered product should contain enough NaOH to give from 4 to 5 molecules of NaOH in the leaching liquor and sintered product combined for each molecule of $Al_2O_3$ in the leaching liquor and sintered product combined (i. e., $Na_2O:Al_2O_3$ ratio is between 2:1 and 2.5:1). If the above mentioned residual sodium aluminate, solution available for leaching does not contain this quantity of soda, additional soda must be added to make up the deficiency.

In leaching the sintered product, the leaching solution is preferably heated above 180° F. in order to render the material readily soluble and shorten the period of time required for leaching. Care, however, must be taken not to heat the leaching solution to too high a temperature, as a temperature at or above the boiling point of water (212 degrees Fahrenheit), causes the silicate to combine with the alumina and soda and form an insoluble double silicate of sodium and alumina, and prevents the recovery of these valuable materials from the solution. Therefore this leaching solution must not be heated to the boiling point of water, and preferably is heated to a temperature approaching but not substantially exceeding 200 degrees Fahrenheit, which is sufficient to render the material readily soluble and render the leaching process rapid, but is not so high as to render the sodium and alumina insoluble. Leaching at a temperature between 180° and 212° F. is a very important point in the process and has not been previously noted by any other investigator.

In the liquor or lye thus produced by leaching the sintered material the alumina is held in solution by the caustic soda, and the solution also contains silica in quantities which may be as much as 2 per cent of the alumina. The solution must be purified to remove this dissolved silica therefrom and this is preferably done by heating the solution in a closed vessel for about two hours to a temperature of about 290 degrees Fahrenheit, corresponding to a pressure of about 40 or 50 pounds per square inch above atmospheric. It is not necessary to limit the operation to this exact temperature or to this exact period of digestion, as they may be changed to suit circumstances; but in general the higher the temperature the shorter the period of time required for digestion.

It is not necessary, in all cases, to precipitate all the silica from the solution by this means, for the reason that when the liquor is afterwards treated for the precipitation of the alumina therefrom (by the Bayer or Fickes process) a certain amount of silica remains in the solution even after the available alumina has been precipitated out. But if the alumina in the aluminate liquor resulting from the leaching is to be precipitated out by the $CO_2$ method, it is necessary to digest this leaching liquor at a high temperature for several hours in order to remove practically all the silica.

The silica and other materials which are precipitated by this digester treatment are filtered off, leaving a sodium aluminate solution from which the alumina may be recovered by any of the methods now in use for precipitating alumina from such solutions, such as by passing carbonic acid gas therethrough, or by agitating the solution, or by the so-called Bayer process which consists in adding to or inoculating the sodium aluminate solution with freshly precipitated aluminum hydrate, and then agitating for a long time (about three days), or by any other known method of precipitating alumina from such solutions. Whichever process is employed results in precipitating the alumina, which is filtered off and washed, while the solution remaining is in part evaporated to dryness to recover sufficient sodium compound for the next furnacing operation, and the remainder used over again for leaching the crushed sintered mass. This residual liquor is a solution of caustic soda and sodium aluminate of comparatively low alumina content, and is especially useful as the leaching liquor.

An especially valuable feature of the foregoing process is the reduction in the amount of the sodium compound added to the other ingredients of the furnace charge and supplying the balance of the sodium compound in the leaching liquor, which preferably is the sodium aluminate liquor remaining after the precipitation of the alumina from a sodium aluminate liquor. Both the soda solution for leaching, as well as the sodium compound which is added to the furnace, are practically all recovered from the residual liquor after the precipitation of the lumina therefrom. The process described is therefore economical on account of the small amount of sodium compound which must be added in the furnace, and even this is recovered in the residual liquor and used over again. The other reagent, to-wit, the lime or limestone, is very cheap and this remains in the calcium silicate residue which is suitable for the manufacture of cement.

The process utilizes aluminous material which has heretofore been considered too low grade for use in the furnace method of making sodium aluminate, to-wit, red mud, or low grade aluminous materials such as certain bauxites and natural clay, which are very widely distributed and of practically unlimited supply.

The process covered by the claims hereinafter made is applicable to the treatment of not only the particular aluminous materials named herein, but also to the treatment of any aluminous material by a furnacing process, in which a sintered mass is produced for subsequent leaching.

What I claim is:—

1. The herein described method of obtaining alumina from aluminous materials of high silica content, comprising mixing with the aluminous material an alkaline reagent containing lime and sodium compound, the latter in the proportion, by weight, of about one molecular equivalent of sodium compound to one molecular equivalent of alumina in the aluminous material; heating the mixture to produce a compound of lime and silica; leaching the product with residual sodium-aluminate solution to dissolve alumina as sodium aluminate, at a temperature below 212° F. and above 180° F., approximately; heating the resulting liquor under pressure to a temperature above 212° F. to precipitate silica; and extracting alumina from the solution.

2. The herein described method of obtaining alumina from aluminous materials of high silica content, comprising mixing lime and sodium compound with the aluminous material, the soda in the proportion, by weight, of about one molecular equivalent of sodium compound to one molecular equivalent of alumina in the material; heating the mixture to produce a compound of lime and silica; leaching the product with a sodium compound solution at a temperature between 180° F. and 212° F. to dissolve alumina as sodium aluminate; and extracting alumina from the solution.

3. The herein described method of obtaining alumina from aluminous materials of high silica content, comprising heating the alumina and silica with lime and sodium compound to produce a compound of lime and silica; leaching the product at a temperature of about 200° F. to dissolve alumina as sodium aluminate; and extracting alumina from the solution.

4. The herein described method of obtaining alumina from materials containing alumina, lime, sodium compound, and a high proportion of silica, which consists in heating the materials to incipient sintering, leaching the product at a temperature of about 200° F. to dissolve alumina as sodium aluminate; and extracting alumina from the solution.

5. The herein described method of obtaining alumina from materials containing alumina, sodium compound, lime and a high proportion of silica, which consists in heating the materials to produce a compound of lime and silica, leaching the product to dissolve alumina as sodium aluminate, heating the solution under pressure to a temperature exceeding 212° F. to precipitate silica, and extracting alumina from the solution thus purified.

6. The herein described method of obtaining alumina from materials containing alumina, lime, sodium compound, and a high proportion of silica, which consists in heating the material to produce a compound of lime and silica, leaching the product to dissolve alumina as sodium aluminate, heating the solution under pressure to a temperature of from 280° F. to 300° to precipitate silica, and extracting alumina from the solution thus purified.

7. The herein described method of obtaining alumina from materials containing alumina, lime, sodium compound, and a high proportion of silica, the sodium compound being in the proportion, by weight, of about one molecular equivalent of sodium compound to one molecular equivalent of alumina, which consists in heating the material, producing a compound of silica and lime and more or less sodium aluminate; leaching the product with a sodium compound solution; and extracting alumina from the resulting solution.

8. The herein described method of obtaining alumina from materials containing alumina, lime, a high proportion of silica, and sodium compound in the proportion, by weight, of about one molecular equivalent of sodium compound to one molecular equivalent of alumina which consists in heating the material to cause a combination of lime and silica, leaching the product with residual liquor resulting from the precipitation of alumina from a sodium aluminate solution to dissolve alumina as sodium aluminate, and precipitating alumina from the solution thus produced.

9. The herein described process which comprises heating to a sintering temperature, but not to fusion, an intimate mixture comprising an aluminous-siliceous material, a calcareous material and a sodium compound, the molecular ratio of lime to silica being between 2.8:1 and 1.2:1 and the molecular ratio of soda to alumina being between 2:1 and 0.6:1, and thereafter leaching the sintered mass with an alkaline solution containing a sodium compound, the molecular ratio of total potential NaOH in the sintered product and leaching liquor to total potential $Al_2O_3$ in the sintered product and leaching liquor being between about 4:1 and about 5:1.

10. In the leaching of sintered unfused alumina-silica-lime-soda mixtures, the step of heating to not above 200° F., such a sintered mixture and an alkaline solution of a sodium compound.

11. In the leaching of sintered unfused alumina-silica-lime-soda mixtures, the step of leaching such sintered product with an alkaline solution of a sodium compound, the molecular ratio of total available NaOH in the sintered product and leaching liquor, and the total available $Al_2O_3$ in the sintered product and leaching liquor being between about 4:1 and about 5:1.

12. The herein described method of obtaining alumina from aluminous materials of high silica content, comprising heating the alumina and silica with lime and sodium compound to produce a compound of lime and silica; leaching the product at a temperature not over about 200° F., with an alkaline solution containing sodium compounds, to dissolve alumina as sodium aluminate; and extracting alumina from the solution.

13. In the treatment of sodium aluminate liquors containing silica, the step of desilicifying the same by heating under pressure to a temperature substantially above the normal boiling point, but not substantially above 300° F., until a substantial part at least of the silica is precipitated, and separating the precipitated silica from the mother liquor.

In testimony whereof, I have hereunto set my hand.

RALPH S. SHERWIN.

Witnesses:
C. E. HODGSON,
H. P. HEHNER.